Nov. 25, 1930.  W. E. GOCHNAUER  1,783,116
TIRE GAUGE
Filed Jan. 17, 1928   2 Sheets-Sheet 1
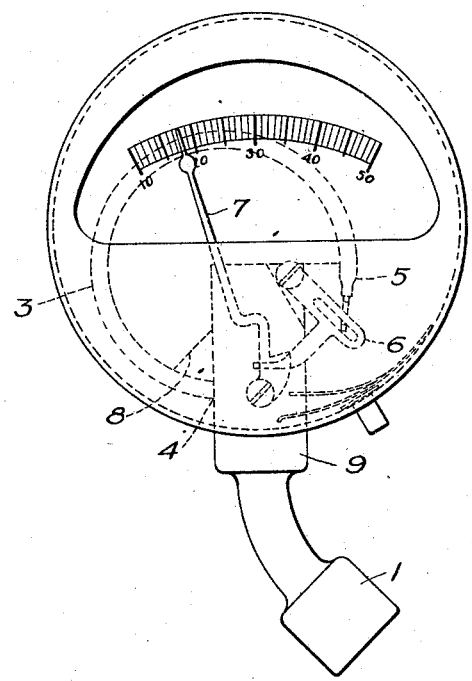
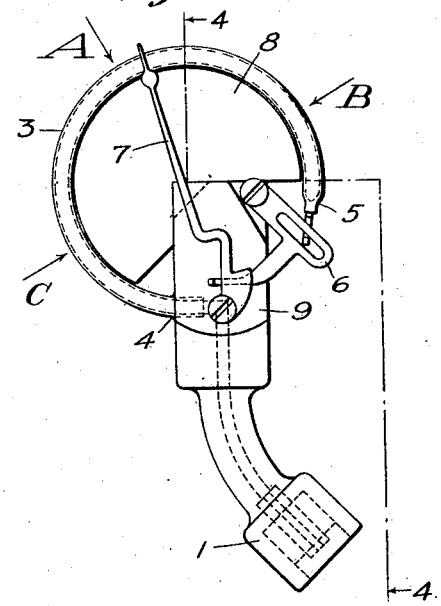
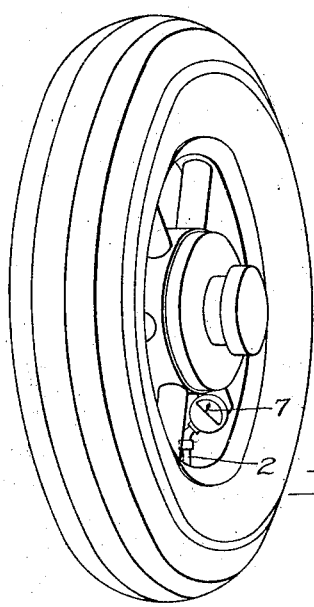
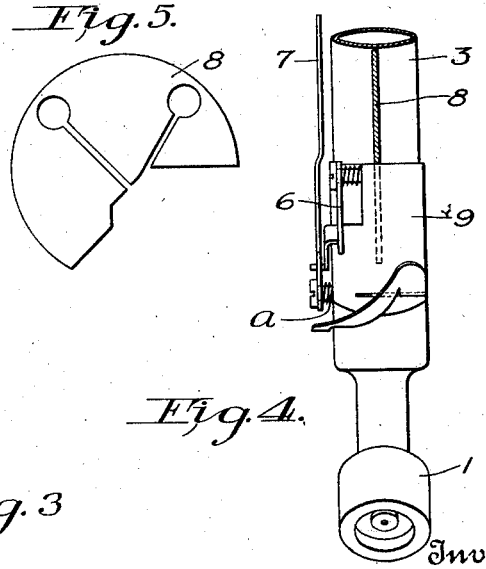
Inventor
Walter E. Gochnauer
By  Attorneys
Nathan & Bowman Patented Nov. 25, 1930

1,783,116

UNITED STATES PATENT OFFICE

WALTER E. GOCHNAUER, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

TIRE GAUGE

Application filed January 17, 1928. Serial No. 247,344.

This invention relates to an improvement in tire gauges and similar devices, wherein a member such as a Bourdon tube comprises the means for transmitting pressure to the pointer of an indicator and is necessarily mounted in such manner as to permit of an excessive amount of oscillation of the said tube when subjected to external shocks and forces, tending to cause a permanent distortion of the tube.

A main feature of this invention is the arrangement of an intermediate support for a substantial portion of the tube that will not interfere with the normal elongation of the tube, but will prevent excessive oscillations or vibrations, due to the shocks and forces to which such instruments are often subjected, and furthermore in many cases no destructive vibration will be allowed to start, and thus a pronounced ruggedness of instrument will be attained.

This intermediate support is so formed and arranged that it will present a plurality of bearing points, extending around the inner surface of the tube, the said intermediate support being in turn supported by the socket member, to which the Bourdon tube is attached.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 6:
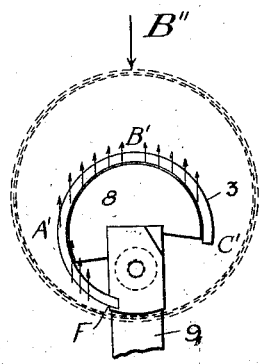
Figure 7:
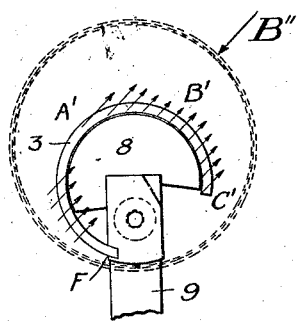
Figure 8:
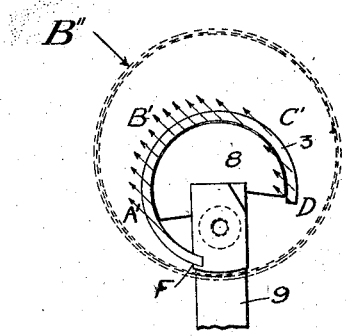

Figure 1 is a front elevational view of a conventional pressure gauge embodying my present invention. Fig. 2 is an elevational view of the gauge removed from the casing showing more clearly the relation between the Bourdon tube and its supporting members. Fig. 3 is a representation of an automobile wheel showing the pressure gauge in place. Fig. 4 is a view along line 4—4 of Fig. 2. Fig. 5 shows a modified form of the supporting member. Figs. 6, 7 and 8 are diagrammatic views illustrating the effect of exterior forces at different points.

In the drawings there is illustrated preferably a tire gauge capable of being applied to a tire, wherein a Bourdon tube is employed, which is subject to distortion under excessive shocks due to exterior forces applied to it.

In the drawings the connector 1 is adapted to be applied to the valve 2 of an automobile tire in the usual and ordinary way and to adapt this gauge for use with a balloon tire, this connector is preferably shown of curved conformation to adapt it to that particular form of tire. The Bourdon tube 3 is fulcrumed at 4 and the free end 5 is connected by the slotted crank arm 6 with the pointer 7 of the gauge, the spring $a$ holding the pointer in its advanced position until returned to normal position by manual means. In this type of gauge, when the connector is forcibly held against the valve of the tire, the air pressure will elongate the tube 3 and thereby movement will be transmitted to the pointer 7 to give an indication of the amount of pressure of the air contained within the tire, there being shown a loose connection between the crank arm 6 and the pointer 7.

But in all devices employing Bourdon tubes great care must be exercised to protect the tube from distortion due to exterior shocks and in such types of tire gauge it has been difficult to devise an arrangement such that the tube would be readily and properly elongated by the air pressure and yet be protected against such external mechanical shocks and forces. To overcome this difficulty, there is shown a semi-circular shaped disk 8 which is supported upon the socket 9 of the connector 1, and the circular exterior surface of this disk extends around the inner surface of the Bourdon tube as shown in Fig. 2. The conformation of the disk is such that its exterior surface is concentric with the inner surface of the tube, and forms bearing points for said tube when the pointer rests in zero or normal position, there being no interference with the normal movement of said tube.

Now, whenever a shock or force is applied externally to the gauge such as to start the free end of the tube vibrating outwardly and away from its normal position, the disk 8 will hold a considerable portion of said tube from acquiring such movement, as for instance that part lying between the points A and C (see Fig. 2) thus confining the movement to the part comprised within the points A and B. In this manner the danger of any distortion of the tube will be greatly reduced, and upon the return movement of the free end of the tube, this disk will act as a stop to that backward movement thereby eliminating all danger of excessive movement due to the synchronizing of the oscillations, when repeated shocks are received of such character as would tend to produce synchronism. Again if the shock or force is applied in a way to produce an inward movement of the tube of considerable moment about the fulcrum, the bearing surface of the disk between the points B and C will prevent that reverse movement by reason of that portion of the tube being in contact with the bearing surface of the disk. In this way there is formed an effective means for preventing distortion of the tube from forces or shocks applied in any and all directions.

To illustrate more clearly the effect of exterior shocks and forces, there are presented three diagrammatic views marked Figs. 6, 7 and 8 which are merely illustrative of the effect of shocks and exterior forces applied at different points. It is to be understood that this may be caused by dropping the gauge or in some similar way subjecting it to severe shocks.

In Fig. 6 the exterior force is applied at substantially a central point through the casing and the direction of the force is indicated by the arrow pointing downwardly and this will cause reacting upward forces shown by the small arrows. In the case illustrated by Fig. 6 there can be no permissible movement between the points F and A'. Consequently, the danger of distortion will be greatly reduced, the tube being much stiffer by reason of its shorter, effective length and there being a reduction of the mass of the tube involve in the motion. In Fig. 7 there is more of the tube restrained by the disk and consequently less movement of the tube permitted, while in Fig. 8 both ends of the tube are restrained and consequently the section A' B' C' will be held by both ends preventing the start of any such movement as described above.

The modified disk, shown in Fig. 5 having slots is especially adapted to conform readily to the contour of different sizes of the tubes. In the event the same disk 8 is used with gauges employing slightly different sizes of Bourdon tubes, the slotted disk is advantageous because it can be compressed or extended to adapt it to both large and small tubes and made to conform with the curve of each tube.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of United States:—

A pressure gauge combining a connector element; an expansible element having one end engaging said connector element, an oscillatable pointer, sliding connecting devices between said pointer and said expansible element and supporting means including a flat disk located within the plane of said expansible element engaging the inner surface of said expansible element for limiting the inward movement thereof under exterior shocks and forces.

In witness whereof, I hereunto subscribe my name.

WALTER E. GOCHNAUER.